(12) United States Patent
Dacko

(10) Patent No.: US 8,056,784 B2
(45) Date of Patent: Nov. 15, 2011

(54) BICYCLE SEAT PACK

(75) Inventor: Daniel Dacko, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 1077 days.

(21) Appl. No.: 11/834,191

(22) Filed: Aug. 6, 2007

(65) Prior Publication Data

US 2009/0039127 A1 Feb. 12, 2009

(51) Int. Cl.
*B62J 7/02* (2006.01)
(52) U.S. Cl. .......................................... 224/427; 224/437
(58) Field of Classification Search .................. 224/427, 224/447, 437, 438, 439
See application file for complete search history.

(56) References Cited

U.S. PATENT DOCUMENTS

| | | | |
|---|---|---|---|
| 3,955,729 A * | 5/1976 | Montgomery | 224/438 |
| 4,566,617 A | 1/1986 | Jackson | |
| 4,643,343 A | 2/1987 | Goldman et al. | |
| 5,127,563 A | 7/1992 | Chan et al. | |
| 5,190,345 A | 3/1993 | Lin | |
| D336,740 S | 6/1993 | Graf | |
| 5,356,058 A | 10/1994 | Fenton | |
| 5,460,303 A | 10/1995 | Downs | |
| 5,474,270 A | 12/1995 | Rixen et al. | |
| 5,573,163 A | 11/1996 | Lee et al. | |
| 5,655,694 A | 8/1997 | Keckeisen et al. | |
| 5,878,930 A | 3/1999 | Schwimmer | |
| 5,893,501 A | 4/1999 | Schwimmer | |
| D444,447 S | 7/2001 | Russell et al. | |
| 7,225,956 B2 | 6/2007 | Lien et al. | |

FOREIGN PATENT DOCUMENTS

WO WO 2006/030259 3/2006

\* cited by examiner

*Primary Examiner* — Justin Larson
(74) *Attorney, Agent, or Firm* — Boyle Fredrickson, S.C.

(57) ABSTRACT

A bicycle accessory container constructed to be supported generally under a seat of a bicycle. The container includes a pair of sidewalls that generally enclose a cavity. A severable closure is attached to the sidewalls and allows the cavity to be selectively enclosed or exposed to atmosphere. A securing member is secured to one or both of the sidewalls within the cavity and is deformable between a first orientation wherein the securing member will pass freely between adjacent seat brackets and a second orientation wherein the securing member will not pass freely through the space between the seat brackets.

20 Claims, 4 Drawing Sheets

BICYCLE SEAT PACK

BACKGROUND OF THE INVENTION

The present invention relates to a bicycle accessory container and, more particularly, to an accessory container or seat pack, constructed to be suspended from beneath a seat of a bicycle.

Interest in recreational and/or competitive cycling continues to increase. The consequence of this popularity of bicycle riding has been a growing presence of bicycle operators or riders or cyclists, of all ages, on public roads or off road trails. Further, as the recreation has grown, typical bicycle excursions or trips have lengthened in extent and, concomitantly a great variety of lighter, multi-geared and faster bicycles have entered the marketplace. Increasingly, as bicycle trips are planned for longer durations and distances, riders commonly prefer to carry several accessories with them during such excursions. Some such accessories can include car keys, identification, small tools, money, sunscreen, electronic devices such as cell phones and the like, etc. Many riders wear clothing that does not include pockets or other containers for carrying such items. Even when wearing clothes with pockets, operating a bicycle with such articles disposed in a pocket can be both a nuisance and/or painful. Accordingly, many riders prefer to have an accessory carrying device that can be supported by the bicycle rather than carried on the rider. One such device is a seat pack.

A seat pack is a container constructed to be suspended or otherwise supported by the seat of bicycle. Positioning, the accessory container near the seat of the bicycle ensures that a rider can access the accessories even during operation of the bicycle. Some seat packs are constructed to be permanently secured to particular bicycle whereas others are constructed to be removably secured thereto. Those seat packs that are constructed to be removable secured to a bicycle generally include a mating structure wherein one part is permanently secured to a particular bicycle and a pack part removably engages the mating structure. Although such systems allow the pack to the removed from the bicycle relatively easily, such systems are not without their drawbacks.

Many seat packs are provided as a two part system, the pack itself and a support bracket. The bracket is mechanically fixed to a seat and the pack removable engages the bracket. Such systems generally require a bracket that is specific to a seat construction and the use of multiple mechanical connectors to secure the bracket to a respective seat. Although such systems provide a removable pack, use of the pack is limited to the bicycle having the bracket attached thereto. Alternatively, the rider must transport the tools necessary to transfer the bracket from one bicycle to another. Furthermore, loss, theft, or damage to either of the pack or the bracket renders the other part of the system virtually useless.

Another drawback of such systems is the relatively complex construction of the connection mechanism configured to allow the removable engagement of the seat pack with the underlying bracket. Commonly, a snap fit connection or otherwise movable members are provided that interact to secure the pack to the bracket. Such systems generally include deformable tabs and/or spring biased members that are constructed to cooperate with mating structures formed on the alternate member of the system. Such configurations complicate the construction of the seat pack system and are also suspect to failure. Generally, if any portion of the interface structure between the pack and the bracket becomes damaged and/or worn, the seat pack system in rendered unreliable and/or unusable.

The riding environment can also impact the life cycle of the seat pack system. Riders who venture from paved surfaces are commonly subjected to more jarring or impact forces than riders who remain on paved surfaces. These forces are translated to the bicycle and any of the accessories and/or accessory mounting systems secured thereto. An accessory containing system such as a seat pack must be constructed to withstand such operating conditions. Furthermore, the means of connecting a seat pack to the bicycle must also be able to withstand the forces associated with extended rides over rough terrain so as to avoid the seat pack from becoming unintentionally detached from the seat.

In view of the above, it will be apparent to those skilled in the art that there exists a need for an improved seat pack system that is easy to use, is engageable with a variety of bicycle seat configurations, is constructed to be quickly and efficiently used with different bicycles, is robust and simple to use, and cost effective to manufacture.

BRIEF DESCRIPTION OF THE INVENTION

The present invention provides a system and method of providing a bicycle seat pack that overcomes one or more of the aforementioned drawbacks. One aspect of the invention includes a bicycle accessory container constructed to be supported generally under a seat of a bicycle. The container includes a pair of sidewalls that generally enclose a cavity. A severable closure, such as a zipper, is attached to the sidewalls and allows the cavity to be selectively opening and closed. A securing member is secured to the seat pack within the cavity and is deformable between a first orientation and a second orientation. When positioned in the first orientation, the securing member will pass freely between adjacent seat brackets and when the securing member is in the second orientation, the securing member will not pass freely through the space between the seat brackets thereby securing the seat pack to the bicycle.

Another aspect of the invention discloses a bicycle accessory container having a body formed of a pliable material and shaped to enclose a volume. A seam formed in the body selectively fluidly connects the volume to atmosphere. A securing member is secured to the body within the volume and is deformable between the first orientation and the second orientation such that the securing member secures the body to a bicycle seat by expanding to a thickness greater than a distance between the seat brackets. Such an accessory container can quickly and efficiently be moved from one bicycle to another.

A further aspect of the invention discloses a bicycle bag having a first sidewall and a second sidewall that are joined about a portion of a perimeter of the first side wall and the second sidewall to selectively enclose a space therebetween. A severable connector is disposed between the first sidewall and the second sidewall along another portion of the perimeter to selectively enclose a space between the first sidewall and the second sidewall. A spring clip is secured to at least one of the first sidewall and the second sidewall and is deformable to selectively secure the bicycle bag to a seat bracket of a bicycle. Such a construction provides a seat pack that is simple to use.

Yet another aspect of in the invention discloses a method of forming a seat pack that includes enclosing a volume with an amount of material. An operable passage is formed between the volume and atmosphere and an adapter is provided that has a first leg and a second leg. The first leg and the second leg are oriented such that the legs are displaceable between a first orientation wherein the adapter can pass freely between adjacent members of a seat bracket of a seat bracket and a second orientation wherein an outward pressure secures the adapter between the adjacent members. Such a method provides a seat pack that can withstand the rigors of bicycle operation and can be efficiently and economically produced.

It is appreciated that these aspects are not mutually and/or individually exclusive with respect to one another. These and various other aspects, features, and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
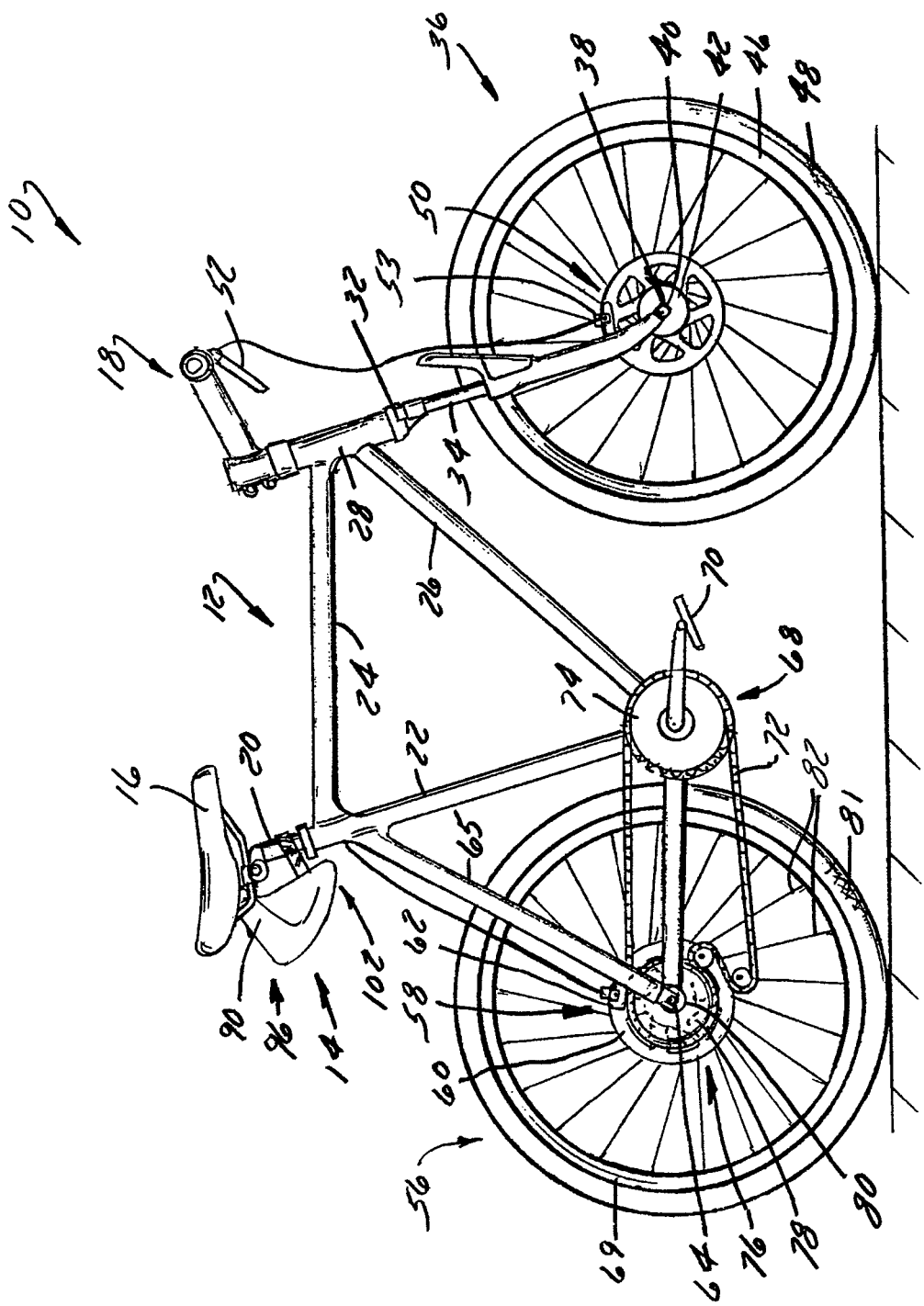
FIG. 1 is an elevational view of the bicycle equipped with a seat pack according to the present invention.

FIG. 1 shows a bicycle 10 equipped with a bicycle accessory container, commonly referred to as a seat pack 14, according to the present invention. Bicycle 10 includes a seat 16 that is slidably attached to a frame 12. A seat post 20 is connected to seat 16 and slidably engages a seat tube 22 of frame 12. A top tube 24 and a down tube 26 extend forwardly from seat tube 22 to a head tube 28 of frame 12. A handlebar or handlebar assembly 18 is connected to a stem tube 30 that passes through head tube 28 and engages a fork crown 32. The position of handlebar assembly 18 is fixed relative to stem tube 30 and fork crown 32 such that handlebar assembly 18 and fork crown 32 rotate together relative to head tube 28.

A pair of forks 34 extend from generally opposite ends of fork crown 32 and are constructed to support a front wheel assembly 36 at an end thereof or fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebar assembly 18. Brake assembly 50 includes a pair of brake pads 53 positioned on generally opposite sides of a rotor 54 secured to front wheel assembly 36. Brake rotor 54 is secured to front wheel assembly 36 proximate hub 42. Alternatively, brake pads 53 could be constructed to engage a sidewall of rim 46. Regardless of the relative engagement, brake pads 53 provide a stopping or slowing force to front wheel assembly 36. A rear wheel assembly 56 includes a disc brake assembly 58 having a rotor 60 and a caliper 62 that are positioned proximate a rear axle 64. A rear wheel 69 is positioned generally concentrically about rear axle 64. Understandably, either or both of front wheel assembly 36 and rear wheel assembly 56 could be equipped with a brake assembly generally similar to a rim brake systems or a disk brake system as shown.

A seat stay 65 and a chain stay 66 offset rear axle 64 from a crankset 68. Crankset 68 includes a pair of pedals 70 that is operationally connected to a chain 72 via a chain ring or sprocket 74. Rotation of chain 72 communicates a drive force to a rear section 76 of bicycle 10 having a gear cluster 78 positioned thereat. Gear cluster 78 is generally concentrically orientated with respect to rear axle 64 and includes a number of variable diameter gears.

Gear cluster 78 is operationally connected to a hub 80 of rear wheel 69. A number of spokes 82 extend radially between hub 80 and a rim 81 of rear wheel 69 of rear wheel assembly 56. As is commonly understood, rider operation of pedals 70 drives chain 72 thereby driving rear wheel 69 which in turn propels the rider of bicycle 10. It is appreciated that the foregoing description of bicycle 10 is merely exemplary of a bicycle for use with the present invention. It is appreciated that seat pack 14 may be secured to and used with bicycles having constructions other than that shown.

Figure 2:
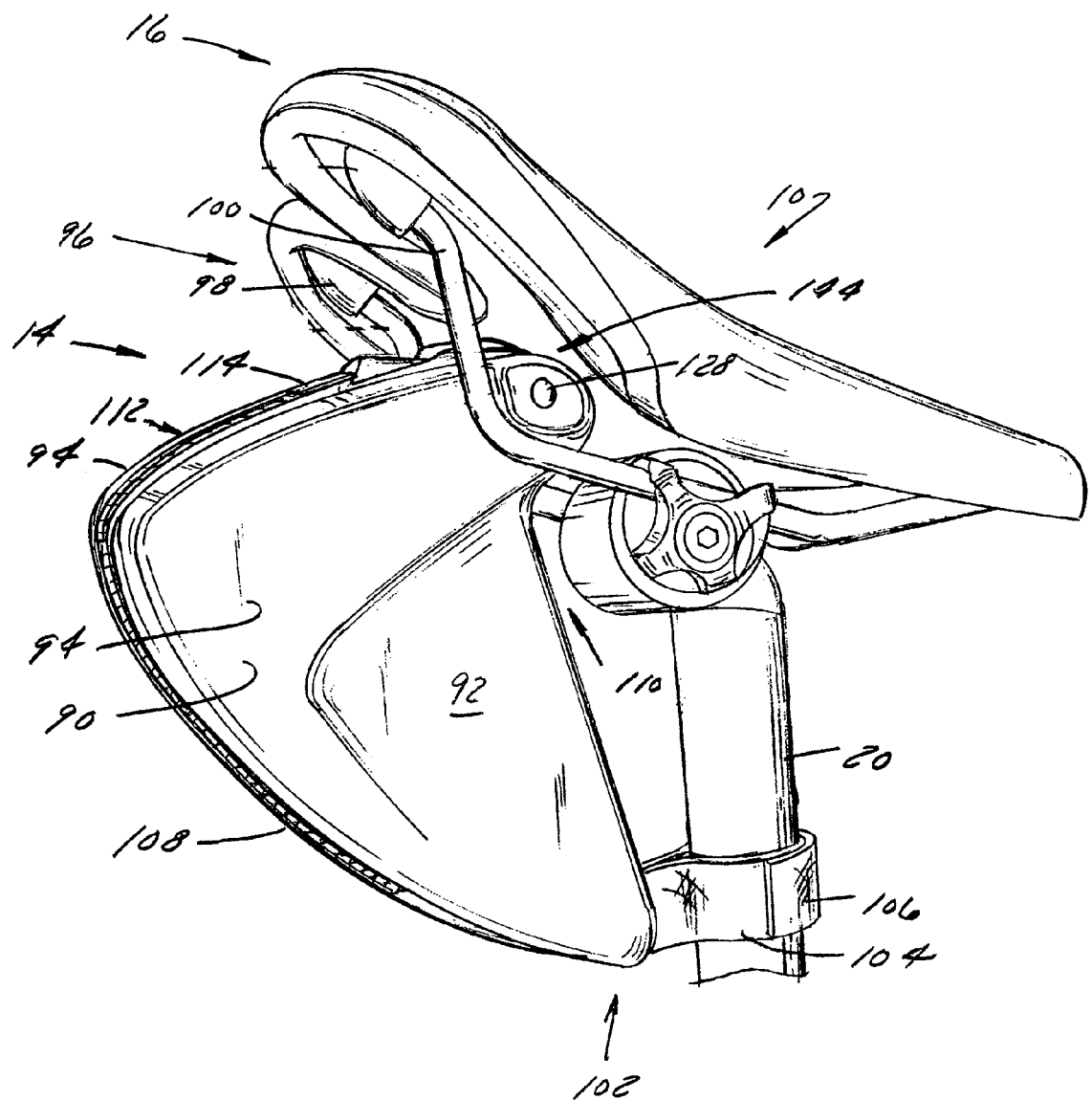
FIG. 2 is detailed elevational view of the seat pack shown in FIG. 1.

Referring to FIGS. 1 and 2, seat pack 14 includes a body 90 having a first sidewall 92 which overlays a second sidewall 94. Preferably, sidewalls 92, 94 of body 90 are constructed of a pliable material such as cloth or a foam backed cloth. A first end 96 of seat pack 14 is constructed to engage seat 16 by slidably engaging a pair of seat brackets 98, 100. A second end 102 of seat pack 14 includes a pair of optional straps 104, 106 that extend from body 90. Preferably, each of optional straps 104, 106 extends from one of sidewall 92 and sidewall 94, respectively. Straps 104, 106 are constructed to cooperatively engage seat post 20 or frame seat tube 22 so as to secure second end 102 of seat pack 14 to bicycle 10. Preferably, straps 104, 106 include a hook and loop connection such that straps 104, 106 may be repeatably secured and removed from a respective seat post 20 or seat tube 22. It is appreciated that only one strap could be provided and include a pair of ends independently securable to seat pack 14. It is further appreciated that straps 104, 106 could be provided with alternative securing means such as a button and a hole, a snap, or the like.

A perimeter 108 of seat pack 14 includes a first portion 110 and a second portion 112. First portion 110 of perimeter 108 is defined as that portion of perimeter 108 wherein first and second sidewalls 92, 94 are generally continuous or first sidewall 92 is otherwise permanently affixed to second sidewall 94. Comparatively, second portion 112 of perimeter 108 includes a seam or severable connector, such as a zipper 114. Severable connector 114 could also be provided as a hook and loop connector, a button and a hole, a snap, or other severable connection. It is further appreciated that although zipper 114 is shown as oriented along an interface of first and second sidewalls 92, 94. Zipper 114 could be provided in one of sidewalls 92, 94. It is further appreciated that body 90, rather than being provided as a pair of sidewalls, could be formed from a generally continuous portion or section of material that is folded over upon itself to at least partially enclose a space or cavity.

Figure 3:
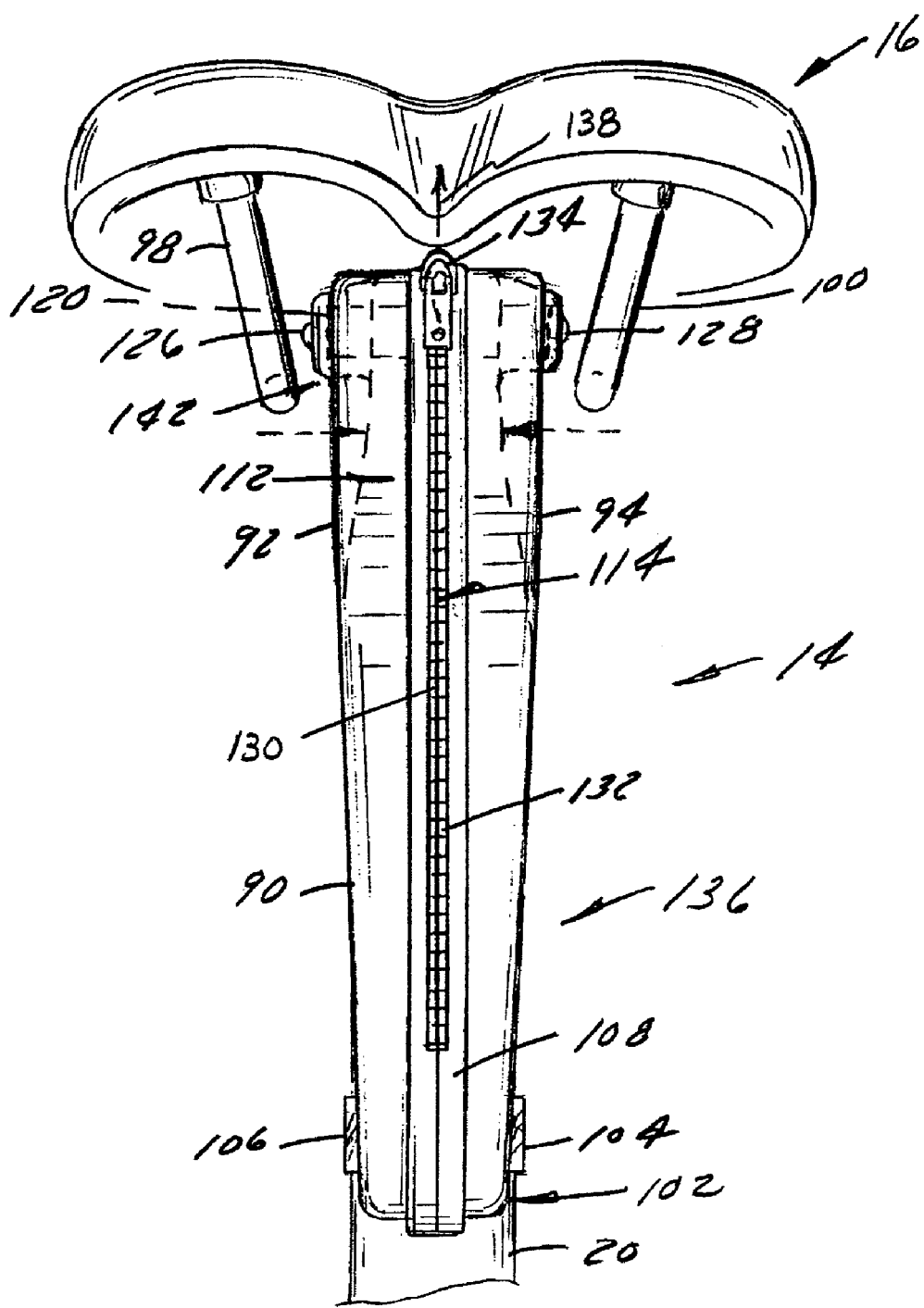
FIG. 3 is a rear elevational view of the seat pack shown in FIG. 1.
Figure 4:
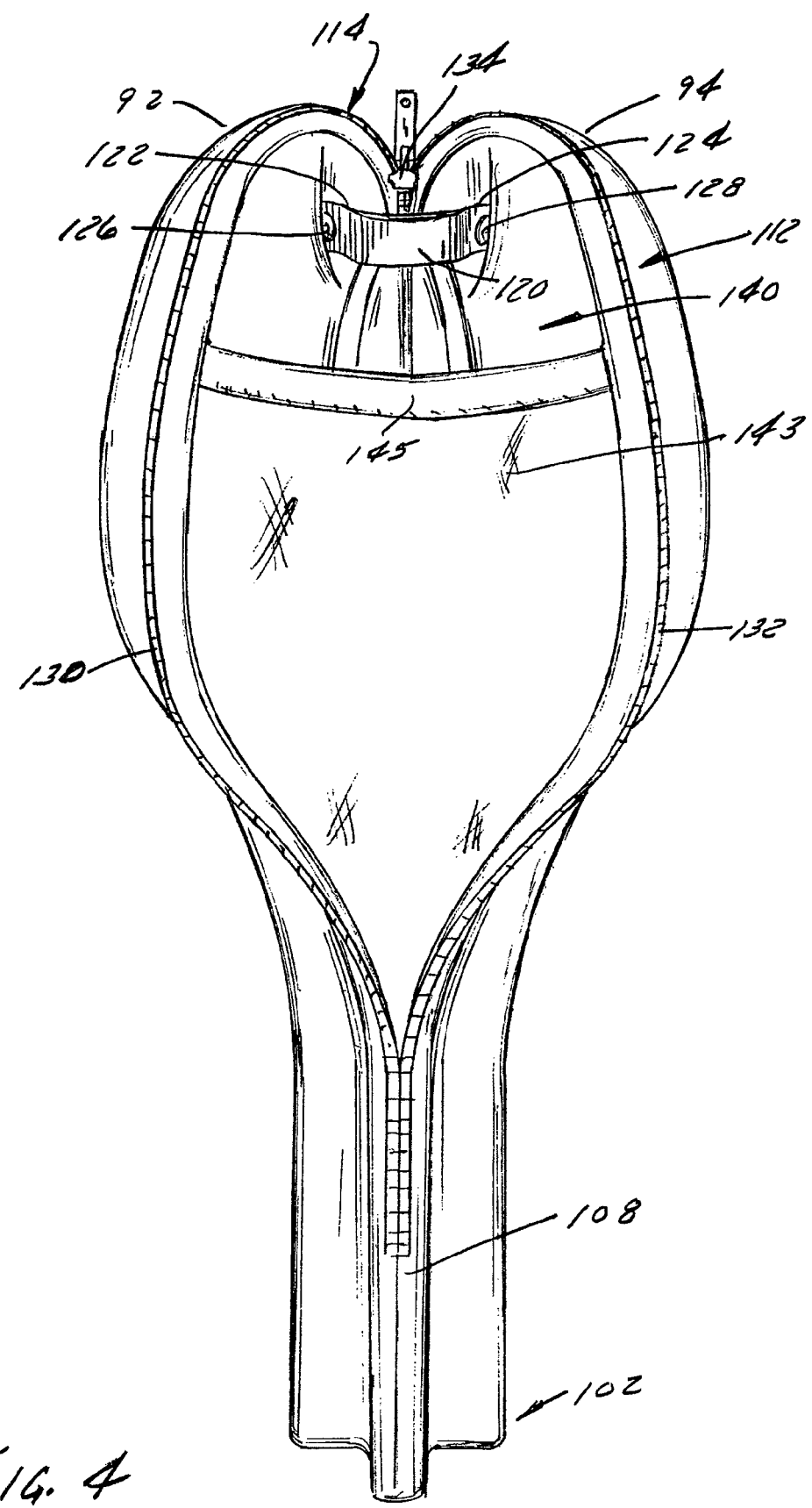
FIG. 4 is a view similar to FIG. 3 with the seat pack in an open orientation and exposing the seat bracket securing member.

Referring to FIGS. 3 and 4, an adapter, securing member, or spring clip 120 includes a first arm 122 and the second arm 124 that are secured to each of sidewalls 92, 94, respectively. A first fastener or rivet 126 secures first arm 122 to first sidewall 92 and a second fastener or rivet 128 secures second arm 124 to second sidewall 94. As described further below, spring clip 120 is provides a reinforced area to body 90 such that seat pack 14 can be repeatably secured to seat 16 of bicycle 10.

Still referring to FIGS. 3 and 4, zipper 114 includes a first row of teeth 130 secured to first sidewall 92 and a second row of teeth 132 secured to second sidewall 94. Zipper 114 includes an operator or slide 134 constructed to translate along portion 112 of perimeter 108 to allow selective engagement and disengagement of rows of teeth 130, 132. As shown in FIG. 3, when row of teeth 130 is engaged with row of teeth 132, seat pack 14 attains a closed orientation 136 wherein slide 134 is oriented in a downward position relative to seat 16. Such a construction allows a rider positioned on seat 16 to manipulate slide 134 thereby allowing the rider to access seat pack 14 during use of bicycle 10. The downward orientation of slide 134 also prevents the unintentional translation of slide 134 relative to rows of teeth 130, 132 during use of bicycle 10.

Translation of slide 134 in an upward direction, indicated by arrow 138 (FIG. 3), relative to seat 16, disengages rows of teeth 130, 132 and thereby exposes a space, volume, or cavity 140 (FIG. 4) that is commonly enclosed by sidewalls 92, 94 to atmosphere. An optional web wall 143 extends between first sidewall 92 and second sidewall 94 within cavity 140 proximate zipper 114. Preferably, optional web wall 143 includes an elastic portion 145 constructed to pull sidewalls 92, 94 to the closed orientation 136 shown in FIG. 3. Web wall 143 dampens the vibration of articles disposed within cavity 140 during use of bicycle 10 as well as maintains an aesthetic appearance of seat pack 14 as it is allows expanding and contracting to accept various cyclist accessories.

Referring to FIGS. 2-4, spring clip 120 is deformable between a first orientation 142, as shown in FIG. 3, and a second orientation 144, as shown in FIG. 2. When positioned in second orientation 144, spring clip 120 secures seat pack 14 to bicycle 10 via its engagement with seat brackets 98, 100. As shown in FIG. 3, first orientation 142 allows seat pack 14 to be translated in either of a forward or an upward direction relative to seat 16 such that spring clip 120 is disposed between seat 16 and seat brackets 98, 100. Manipulation of spring clip 120 past seat brackets 98, 100, provides a tactile indication that spring clip 120 has achieved second orientation 144; thereby indicating to the user that seat pack 14 is secured to bicycle 10.

Comparing FIGS. 2 and 3, it is shown that spring clip 120 secures seat pack 14 to bicycle 10 by expanding to a width that is greater than a distance between seat brackets 98, 100. Furthermore, as there are no intervening members between seat pack 14 and seat brackets 98, 100, seat pack 14 can simply and efficiently be used with more than one bicycle. Additionally, as spring clip 120 does not directly engage seat brackets 98, 100, seat pack 14 is useable with a variety of bicycle seat constructions. Accordingly, seat pack 14 is highly versatile with respect to its use and application. Additionally, as there are no intervening members, seat pack 14 can be economically manufactured for use across an entire product platform rather than being tailored for use with a specific seat or bicycle structure.

Therefore, one embodiment of the invention includes a bicycle accessory container that has a body formed of a pliable material and shaped to enclose a volume. A seam is formed in the body to selectively fluidly connect the volume to atmosphere. A securing member is secured to the body within the volume and is deformable between a first orientation and a second orientation. When positioned in the first orientation, the securing member passes freely between a pair of seat brackets and when the securing member is in second orientation, the securing member secures the body to a bicycle seat by expanding to a thickness greater than a distance between the seat brackets.

Another embodiment of the invention includes a bicycle bag having a first sidewall and a second sidewall. The sidewalls are joined along a portion of a perimeter of the first side wall and the second sidewall. A severable connector is disposed between the first sidewall and the second sidewall along another portion of the perimeter to selectively enclose a space between the first sidewall and the second sidewall. A spring clip is secured to at least one of the first sidewall and the second sidewall and is deformable to selectively secure the bicycle bag to a seat bracket of a bicycle.

A method of forming a seat pack according to another embodiment of the invention includes enclosing a volume with an amount of material. An operable passage is formed between the volume and atmosphere. An adapter is provided that has a first leg and a second leg. The first leg and the second leg of the adapter are orientated such that the legs are displaceable between a first orientation wherein the adapter can pass freely between adjacent members of a seat bracket and a second orientation wherein an outward pressure secures the adapter between the adjacent members.

The present invention has been described in terms of the preferred embodiment, and it is recognized that equivalents, alternatives, and modifications, aside from those expressly stated, are possible and within the scope of the appending claims. It is further understood and appreciated that that the various aspects, features, and embodiments disclosed herein are not solely or mutually exclusive.

What is claimed is:

1. A bicycle accessory container comprising:
   a body formed of a pliable material and shaped to enclose a volume;
   a seam formed in the body to selectively fluidly connect the volume to atmosphere; and
   a securing member having first and second ends located on opposite sides of the seam, the securing member being secured to the body and contained within the volume, the securing member being deformable between a first orientation wherein the securing member passes freely between a pair of seat brackets and a second orientation wherein the securing member secures the body to a bicycle seat by expanding to a thickness greater than a distance between the seat brackets.

2. The bicycle accessory container of claim 1 wherein the securing member is a plate spring having a pair of legs secured to the body within the volume.

3. The bicycle accessory container of claim 2 further comprising a pair of fasteners, each fastener securing a respective leg of the plate spring to the body.

4. The bicycle accessory container of claim 1 wherein the seam is one of a zipper, a button and hole, a snap, and a hook and loop fastener.

5. The bicycle accessory container of claim 4 wherein the seam faces rearward relative to a bicycle seat when the bicycle accessory container is secured to a bicycle seat.

6. The bicycle accessory container of claim 1 further comprising another securing member to extend forward from the bicycle accessory container to engage one of a seat stem or a seat tube when the bicycle seat container is secured to a bicycle seat.

7. The bicycle accessory container of claim 6 wherein the another securing member includes a first strap and a second strap that engage one another in a hook and loop fashion.

8. A bicycle bag comprising:
   a first sidewall;
   a second sidewall joined to the first sidewall along a portion of a perimeter of the first side wall and the second sidewall;
   a severable connector disposed between the first sidewall and the second sidewall along another portion of the perimeter to selectively enclose a space between the first sidewall and the second sidewall; and a spring clip secured to at least one of the first sidewall and the second sidewall and extending in a direction that crosses a direction of operation of the severable connector, the spring clip being deformable to alter a distance between the first side and the second sidewall to selectively secure the bicycle bag to a seat bracket of a bicycle.

9. The bicycle bag of claim 8 wherein the spring clip includes a first arm secured to the first sidewall and a second arm secured to the second sidewall.

10. The bicycle bag of claim 9 further comprising a first fastener securing the first arm to the first sidewall and a second fastener securing the second arm to the second sidewall.

11. The bicycle bag of claim 8 wherein the severable connector includes a first row of teeth secured to the first sidewall, a second row of teeth secured to the second sidewall, and a slide disposed between the first row of teeth and the second row teeth for selectively engaging and disengaging the first row of teeth and the second row of teeth with translation of the slider along a longitudinal length of the first and second rows of teeth.

12. The bicycle bag of claim 11 wherein the slide is positioned forward of the spring clip when the severable connector is closed and the bicycle bag is engaged with the seat bracket.

13. The bicycle bag of claim 8 wherein the spring clip provides a tactile indication that indicates the spring clip is fully engaged with the seat bracket.

14. The bicycle bag of claim 8 further comprising a pair of straps extending from a portion of the bicycle bag generally opposite the severable connection.

15. The bicycle bag of claim 8 wherein the sidewalls are invertible by translation through an opening defined by the severable connector.

16. A method of forming a seat pack comprising:
enclosing a volume with an amount of material;
forming an operable passage between the volume and atmosphere;
providing an adapter having a first leg and a second leg;
positioning the adapter in the volume enclosed by the amount of material; and
orientating the first leg and the second leg such that the legs are on opposite sides of the operable passage and are displaceable between a first orientation wherein the adapter can pass freely between the adjacent members of a seat bracket and a second orientation wherein an outward pressure secures the adapter between the adjacent members.

17. The method of claim 16 further comprising securing the first leg and the second leg to the material inside the volume with a grommet.

18. The method of claim 16 further comprising forming the operable passage with a zipper.

19. The method of claim 18 further comprising securing a pair of straps to a portion of the material remote from the zipper for engaging one of a seat post or a seat stem of a bicycle.

20. The method of claim 16 further comprising forming the operable passage to be oriented generally vertically when the seat pack is engaged with the seat bracket.

* * * * *